(12) United States Patent
Tagestad et al.

(10) Patent No.: US 10,078,890 B1
(45) Date of Patent: Sep. 18, 2018

(54) ANOMALY DETECTION

(71) Applicant: CHS North LLC, Inver Grove Heights, MN (US)

(72) Inventors: Jerry D. Tagestad, Richland, WA (US); Chris Rushing, Lake Oswego, OR (US); Josh Brungardt, Bend, OR (US); Chris Joyce, Bend, OR (US); Bjorn Roth, Bend, OR (US)

(73) Assignee: CHS North LLC, Inver Grove Heights, MN (US)

( * ) Notice: Subject to any disclaimer, the term of this patent is extended or adjusted under 35 U.S.C. 154(b) by 0 days.

(21) Appl. No.: 15/280,203

(22) Filed: Sep. 29, 2016

(51) Int. Cl.
G06K 9/00 (2006.01)
G06T 7/00 (2017.01)
G06K 9/62 (2006.01)

(52) U.S. Cl.
CPC ........ *G06T 7/0004* (2013.01); *G06K 9/00657* (2013.01); *G06K 9/6202* (2013.01); *G06T 2207/30128* (2013.01)

(58) Field of Classification Search
CPC ........ G06T 7/0004; G06T 2207/30128; G06K 9/6202; G06K 9/00657
See application file for complete search history.

(56) References Cited

U.S. PATENT DOCUMENTS

| | | | |
|---|---|---|---|
| 9,147,265 B2 | 9/2015 | Robinson | |
| 2009/0080700 A1* | 3/2009 | Lau | F41G 3/147 382/103 |
| 2011/0057802 A1* | 3/2011 | Topfer | A61B 6/585 340/584 |
| 2016/0239709 A1* | 8/2016 | Shriver | G06K 9/00657 |

* cited by examiner

*Primary Examiner* — Ping Hsieh
(74) *Attorney, Agent, or Firm* — Dorsey & Whitney LLP

(57) ABSTRACT

Disclosed herein are methods and systems for anomaly detection within a field using images or sensor data. An anomaly detection process determines whether a pixel or a cluster of pixels fit within calculated or modeled expectations to identify an anomaly. The process can further analyze the anomaly to determine a likely cause. Example anomaly detection techniques account for intra-field inhomogeneity and for non-crop regions. Example anomaly detection techniques also can identify anomalous regions.

20 Claims, 6 Drawing Sheets

US 10,078,890 B1

ANOMALY DETECTION

FIELD

Disclosed embodiments relate generally to the field of image processing, and in particular to methods and systems for improving performance of detecting anomalies within images.

BACKGROUND

Fields of crops can be damaged from excessive moisture, insufficient moisture, weed infestation, insect damage, hail damage, nutrient deficiency, disease, and other causes. Detection and correction of these problems can help improve crop yields. Although farmers and agronomists can investigate fields, there remains a need for new and improved processes for early detection of anomalies to guide the discovery of potential crop issues. In particular, there remains a need for new products and techniques that provide for a robust process for identifying anomalies within a field.

SUMMARY

Technologies are generally described that include methods and systems.

An example method may include computing first pixel statistics of pixels of a first hyperspectral image of agricultural land, the pixels within boundaries specified by field boundary data. Example methods may further include generating a pixel mask using the first pixel statistics or historical data. Example methods may further include applying the pixel mask to the first hyperspectral image to generate a second hyperspectral image. Example methods may further include forming groups of pixels of the second hyperspectral image using zone strata of the agricultural land. Example methods may further include computing second pixel statistics using the groups of pixels of the second hyperspectral image. Example methods may further include identifying a pixel clump within the second hyperspectral image using the second pixel statistics, the pixel clump representing an anomalous area within the agricultural land. Example methods may further include predicting a source of anomaly of the pixel clump. Example methods may further include generating an anomaly map using the pixel clump and the predicted source of anomaly of the pixel clump.

Another example method may include stratifying a hyperspectral image of an agricultural field into strata, the strata representing zones of crop variation due to non-anomalous intra-field inhomogeneity. Example methods may further include applying an extreme value filter to the hyperspectral image that masks pixels of the hyperspectral image that are more than three standard deviations from a mean pixel value. Example methods may further include calculating pixel statistics of the filtered hyperspectral image according to the strata. Example methods may further include using the pixel statistics to isolate one or more clumps of pixels of the filtered hyperspectral image, each clump representing an anomaly within the agricultural field. Example methods may further include providing a location of at least one of the one or more anomalies.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
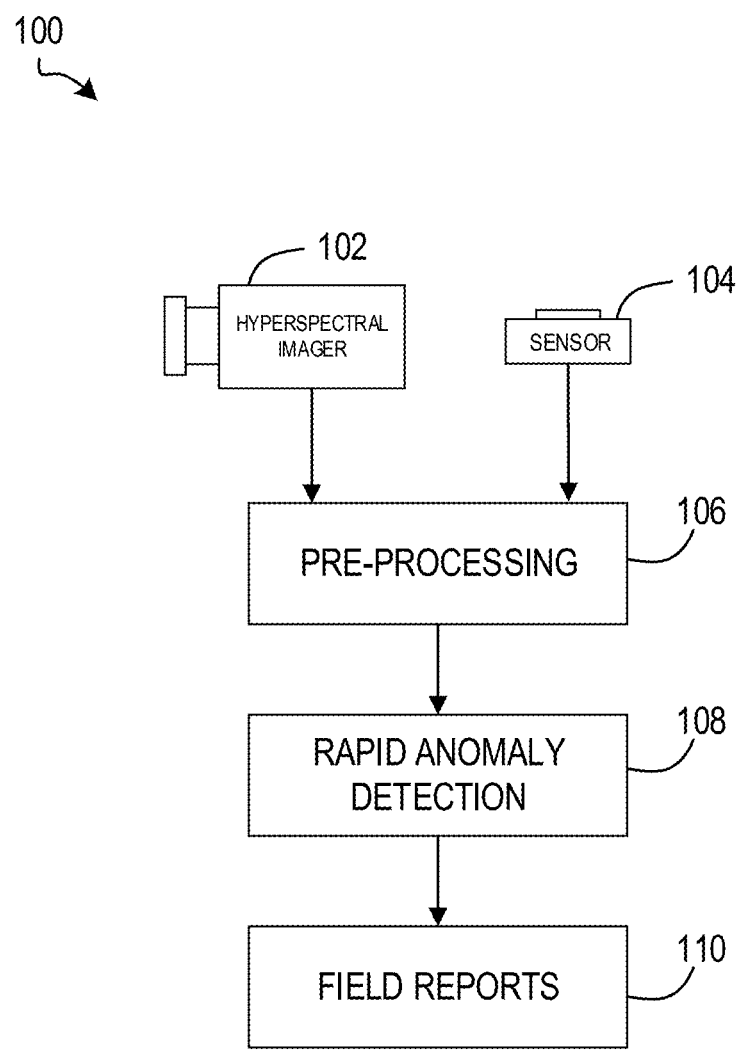
FIG. 1A illustrates an example process for producing a field report using data received from a hyperspectral imager.

Detection of anomalies within a crop field can help farmers, agronomists, and others locate and correct problem areas within a field and improve crop yields. While informative, simple anomaly detection techniques can be incomplete and can result in an unacceptable false positive and false negative rate. Rapid anomaly detection can provide improvements, including lower rates of false positives and false negatives. In an example, a rapid anomaly detection process determines whether a pixel or a cluster of pixels fit within calculated or modeled expectations to identify an anomaly. The process can further analyze the anomaly to determine a likely cause. Example rapid anomaly detection techniques can account for intra-field inhomogeneity, can account for non-crop regions, and can identify anomalous regions.

In an example, a rapid anomaly detection method includes processes that improve accuracy by accounting for intra-field inhomogeneity. Agricultural fields often contain non-anomalous areas of inhomogeneity caused by non-anomalous variations within the field. Comparing a subset of the field against selected characteristic of the overall field (e.g., an average reflectance value of the field) can result in highly sensitive anomaly detection that can cause false positives or negatives caused by normal, intra-field inhomogeneity. An example rapid anomaly detection process can improve anomaly detection by accounting for intra-field inhomogeneity by stratifying the field into smaller, more uniform strata. Individual pixels or clusters thereof can then be compared against statistics of a respective zone strata to identify anomalies, thereby reducing rates of false positives and false negatives.

In an example, rapid anomaly detection includes processes for accounting for non-crop regions as a cause of false positives and/or skewed pixel statistics. For example, the average reflectance of a field can be skewed higher if the field contains a building with a highly-reflective roof. Non-crop regions that can be misidentified as crop anomalies or otherwise affect anomaly detection can include irrigation infrastructure, roads, farm equipment, outbuildings, un-seeded areas, and other non-crop elements that can be within a hyperspectral image of field. A rapid anomaly detection process can account for these non-crop regions by applying an extreme value filter that masks pixels that have a value beyond a threshold (e.g., more than three standard deviations from a mean pixel value).

A similar technique can be applied to remove (or select for) particular kinds of crops in an intercropped field. For example, a field can contain multiple different kinds of crops. A certain kind of crop can be removed (e.g., masked-off) or selected based on the crop's spectral characteristics. The remaining image can then analyzed for anomalies.

A rapid anomaly detection processes can use full dimensionality of hyperspectral imagery and landscape variables to identify and classify anomalies by their likely cause. Hyperspectral imagery and topography (e.g., landscape position or landscape characteristics) statistics are aggregated by anomaly regions to create phenomena signatures, such as vegetation feature signatures. The rapid anomaly detection process may also be applied to non-hyperspectral data, including but not limited to multispectral data and other sensed data. The phenomena signatures can be compared against a library of known signatures to identify the closest match.

FIG. 1A illustrates an example workflow method 100 for producing a field report with rapid anomaly detection using hyperspectral imager 102 data. The hyperspectral imager 102 is a device for generating a hyperspectral image of a scene of interest, such as an agricultural field. One or more other sensors 104 can be used to gather additional data. The other sensors can include location sensors, other imaging systems (e.g., thermal, RADAR, fluorescence sensors), and other sensors.

In an example, the hyperspectral imager 102 and the other sensors 104 are located on an aircraft and used to generate aerial images of the scene of interest. The aircraft can include onboard processing equipment for processing the images and other received data, such as data regarding the images (e.g., imager settings), time, weather conditions, and other data. This data can be associated with the generated images as metadata and can be used to aid in processing of the images.

An example process 100 for producing a field report using the images may begin with block 106, which recites "pre-processing." Block 106 may be followed by block 108 which recites "rapid anomaly detection." Block 108 may be followed by block 110 which recites "field reports."

Block 106 recites "pre-processing." Pre-processing includes initial processing of images and other data received from the hyperspectral imager 102 and the other sensors 104. Pre-processing prepares these images or other data for subsequent processing, such as rapid anomaly detection in block 108. Pre-processing can include bad-image detection, error detection, reflectance and indices processing, and atmospheric correction. Some of the pre-processing can be performed using a processing unit on an aircraft as it is flying. This onboard processing can alert the aircraft's operator to errors or other problem so paths can be re-flown to capture or recapture correct data without needing to land. Some of the pre-processing can be performed by a computer system suitable for processing, such as computer system 400 described in relation to FIG. 4.

In an example, the pre-processing includes the detection of bad images. Bad images are images with defects past a threshold of impairing subsequent usefulness of the image. In an example, bad images can include an image that is obscured by clouds, an out-of-focus image, a blurry image, images with visual artifacts, corrupted images, and other defective images sufficient to compromise the usefulness of the images in detecting anomalies within a field being imaged. The detection of bad images can also detect errors in the image, such as dropped frames or corrupt GPS data. For instance, if the hyperspectral imager 102 or other sensors 104 are run at a high framerate and there is a delay at data processing unit on board the aircraft, the processing unit may fail to properly record GPS or other data. As a result, there may be more image frames than GPS frames, which can cause later processing to miss several frames of data and may cause errors.

In an example, the pre-processing includes determining if a hyperspectral image has anomalies caused by the hyperspectral imager 102 itself. Hyperspectral instruments tend to spectrally shift during their lifespan, which can cause spectral anomalies or otherwise produce inaccurate data. Detecting such anomalies can include determining the mean location of the oxygen-feature Fraunhofer line at approximately 760 nanometers in raw data. A processing unit can flag any images that have an offset of +/−1 nanometer. A processing unit monitoring the spectral location of the oxygen feature can remove or flag and correct images with raw spectral anomalies before such images make it into an imaging pipeline, thereby saving processor cycles, memory, and time that would otherwise be wasted on erroneous images.

In an example, the pre-processing includes atmospheric correction. An atmospheric correction process may include using sun zenith and azimuth for each flight line at time of image acquisition to apply a correction to images.

In an example, the pre-processing includes associating one or more images with each other, associating images with metadata, or otherwise organizing collected data in a manner for subsequent processing.

Block 108 recites "rapid anomaly detection." Rapid anomaly detection is a process of detecting anomalies within a field using an image or other sensor data. This process can include isolating areas of a hyperspectral image that are abnormal to guide the discovery of potential crop issues. An anomaly may be a pixel or cluster of pixels that do not fit within a calculated or modeled expectation. Anomalies detectable in hyperspectral images of crop fields may include anomalies caused by insects, disease, hail damage, nutrient deficiency, or other factors. The rapid anomaly detection process may output a list of anomalies or potential anomalies in a field along with a respective anomaly's location. The rapid anomaly detection process may operate according to systems and methods described herein, including but not limited to those shown and described with regard to FIG. 3.

Block 110 recites "field reports." A field report is a report describing a field, which can be used by farmers, agronomists, or others in the process of managing a field. A field report may include a list of anomalies or potential anomalies informed by the rapid anomaly detection operation of block 108. A field report may include a map showing areas of anomalies, summaries of crop samples, recommendations for managing the field, and other information.

Figure 1B:
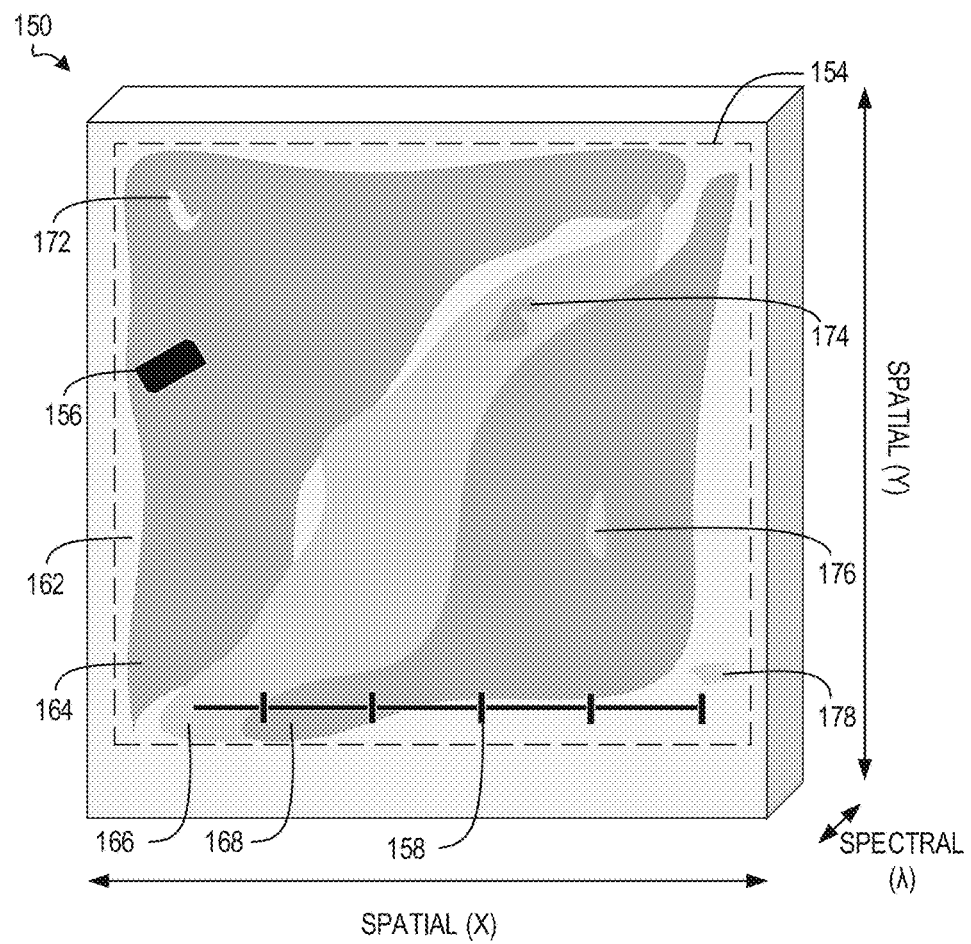
FIG. 1B illustrates an example hyperspectral image.

FIG. 1B illustrates an example hyperspectral image 150 having spatial (x and y) and spectral (λ) dimensions. The image 150 includes a field within a field boundary 154, a tractor 156, and irrigation equipment 158. The field boundary 154 represents the boundaries of a field or another area of interest. Within the field are a zone stratum 162, a zone stratum 164, a zone stratum 166, and a zone stratum 168 (collectively zone strata 160), each representing areas of normal crop variation due to intra-field inhomogeneity. The field also includes an anomaly 172, an anomaly 174, an anomaly 176, and an anomaly 178 (collectively anomalies 170). The anomalies 170 are areas within the field having abnormal characteristics, which may be caused by, for example, crop damage from pests, disease, or other causes.

Figure 2:
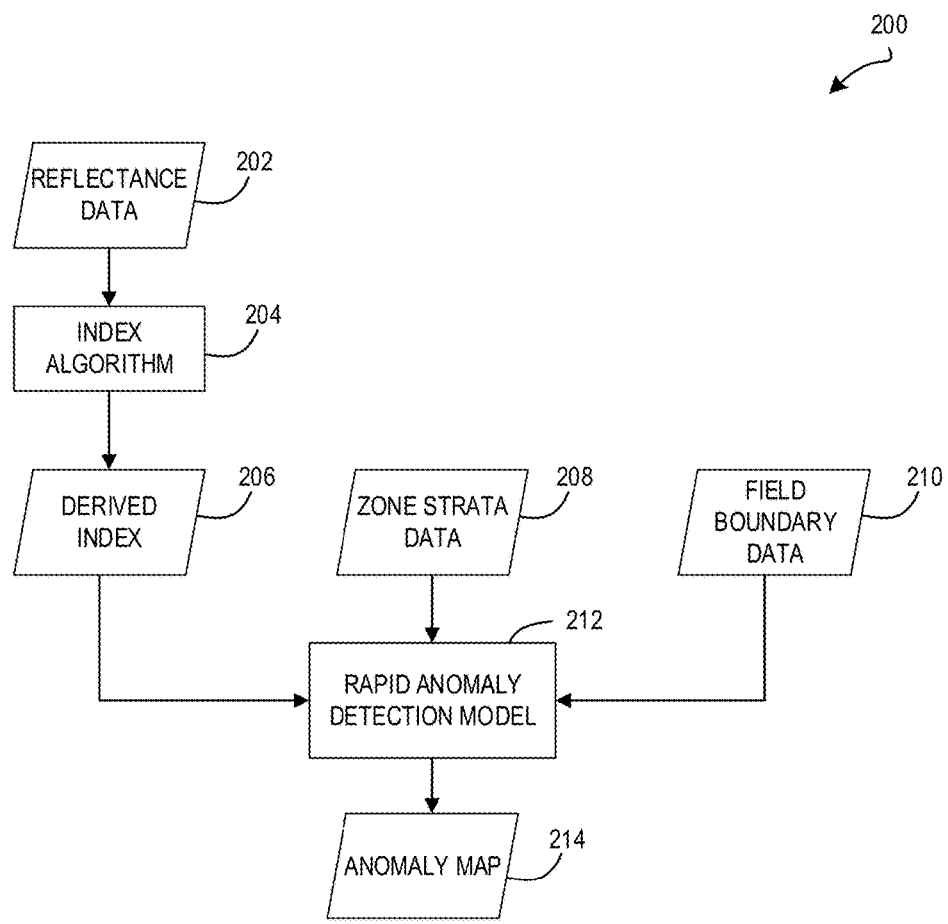
FIG. 2 illustrates a workflow method for producing an anomaly map.

FIG. 2 illustrates a workflow method 200 for producing an anomaly map using a rapid anomaly detection model 212. The rapid anomaly detection model 212 can use a derived index 206, zone strata 208, and field boundary data 210 as input.

The derived index 206 can be produced by running reflectance data 202 through an index algorithm 204. The reflectance data 202 is data of a hyperspectral product. Reflectance is the ratio of the amount of light leaving a target to the amount of light striking the target. The index algorithm 204 uses the reflectance data to produce a derived index 206. The derived index may be selected based on crop type, timing, the input image, weather, and other variables. An index may be a pixel layer derived from the hyperspectral reflectance image. The index may represent the magnitude of a vegetation feature or some phenomena, such as chlorophyll concentration, photosynthetic activity, chlorophyll, physiological change, canopy changes, leaf area variation, crop density, chlorophyll change, anthocyanin presence or levels, carotenoid presence or levels, and combinations and variations thereof. An image converted to an index may amplify or maximize the signal of the vegetation feature or phenomena of interest and subtract or minimize the signal from other vegetation features or other phenomena not of interest such as soil effects, water stress, leaf area variation effects, crop density effects. For example, in agricultural crops, indices related to vegetation vigor provide the ability to focus attention on areas that are anomalously low which may indicate a developing problem.

The zone strata data 208 is data regarding stratification of a field into strata according to general areas of non-anomalous crop variation due to intra-field inhomogeneity of the crop. The strata are substantially homogenous for variables affecting yield or detection of anomalies. The strata are areas of homogenous growth and can be derived from spectra, yield, soil, topography, and other factors. In an example, an analyst can produce zone strata data manually. In another example, zone strata can be algorithmically produced. A machine learning algorithm can cluster or otherwise designate zone strata. An algorithm can combine two or more geospatial datasets using a tunable classifier to create zone strata. A same field can be stratified in different manners depending on particular anomalies that are being searched The zone strata data 208 can be formatted as a data structure associating with particular pixels or groups of pixels with a respective zone. Zone strata can be derived from a variety of sources. For example, soil maps, crop yield patterns, remote sensing images or a combination of these variables can be used to make zone maps. These zones may be employed for a myriad of precision agriculture functions to represent homogeneous areas with similar properties and/or potential. The zones strata data 208 may be used to constrain pixel statistics by areas of similarity, and effectively create a new population with particular statistics (e.g., mean and standard deviation specific). This can allow for more sensitive detection of a vegetation feature or other phenomena that may be hidden in the larger population statistics. In some examples, additional data can be specified for the strata. There may be correction factors that can be applied for calculations within the strata. For instance, a particular strata may have an average reflectance that is 10% higher than the rest of the field. This 10% value can be stored as a correction factor to be applied to pixels within the strata when performing calculations on the strata.

The zone strata data 208 can be used as input to the rapid anomaly detection model 212 to control for non-anomalous intra-field variation. In this manner, zone strata data 208 can be used to reduce false positive rates and can assist in the identification of more subtle anomalies. For example, to accurately identify anomalies within a field, the rapid anomaly detection model 212 may compare each pixel to the others in the field. This can be done statistically by comparing each pixel to the mean value for the field and identifying those pixels with values farthest from the mean value as being the most anomalous. However, if the field is large and variable, this approach may simply identify normal crop variation due to intra-field inhomogeneity, which can produce errant results when attempting to detect anomalies. This can be alleviated using zone strata data 208 as a correction factor or other input into the rapid anomaly detection model. For example, zone strata data 208 can be applied such that the deviation of each pixel is measured against the mean for the stratum to which the pixel belongs. This may result in identification of anomalies that may have been concealed in the wider distribution.

The field boundary data 210 is data representing bounds of a field or other area of interest. For example, a field boundary data 210 may represent the physical confines of a crop field or a subset of a crop field (e.g., one or more rows of crops) or it may represent an artificial boundary. Field boundary data 210 may be automatically detected by an algorithm, may be specified (e.g., based on data from an agronomist or other source), and/or may be based on historical data (e.g., a field boundary set a last time the algorithm was run, etc.). Field boundary data 210 may be generated or verified using aerial photography.

The field boundary data 210 may be used as input into the rapid anomaly detection model 212. The field boundary data 210 may be used later to crop or mask an image or otherwise focus on a particular area of interest of an image.

The rapid anomaly detection model 212 is a model that is used to detect anomalies within a field using image or other sensor data. The rapid anomaly detection model 212 may receive various inputs to analyze conditions of a field and produce an output. The rapid anomaly detection model 212 may operate according to systems and methods described herein, including but not limited to those shown and described with regard to FIG. 1 and FIG. 3. The rapid anomaly detection model 212 may use the derived index 206, zone strata 208, and field boundaries 210 to produce output. The output may include an anomaly map 214.

The anomaly map 214 is a map or other description of anomalies in a field identified using the rapid anomaly detection model. The anomaly map 214 may be incorporated into or used to produce a field report describing conditions of a field.

Figure 3A:
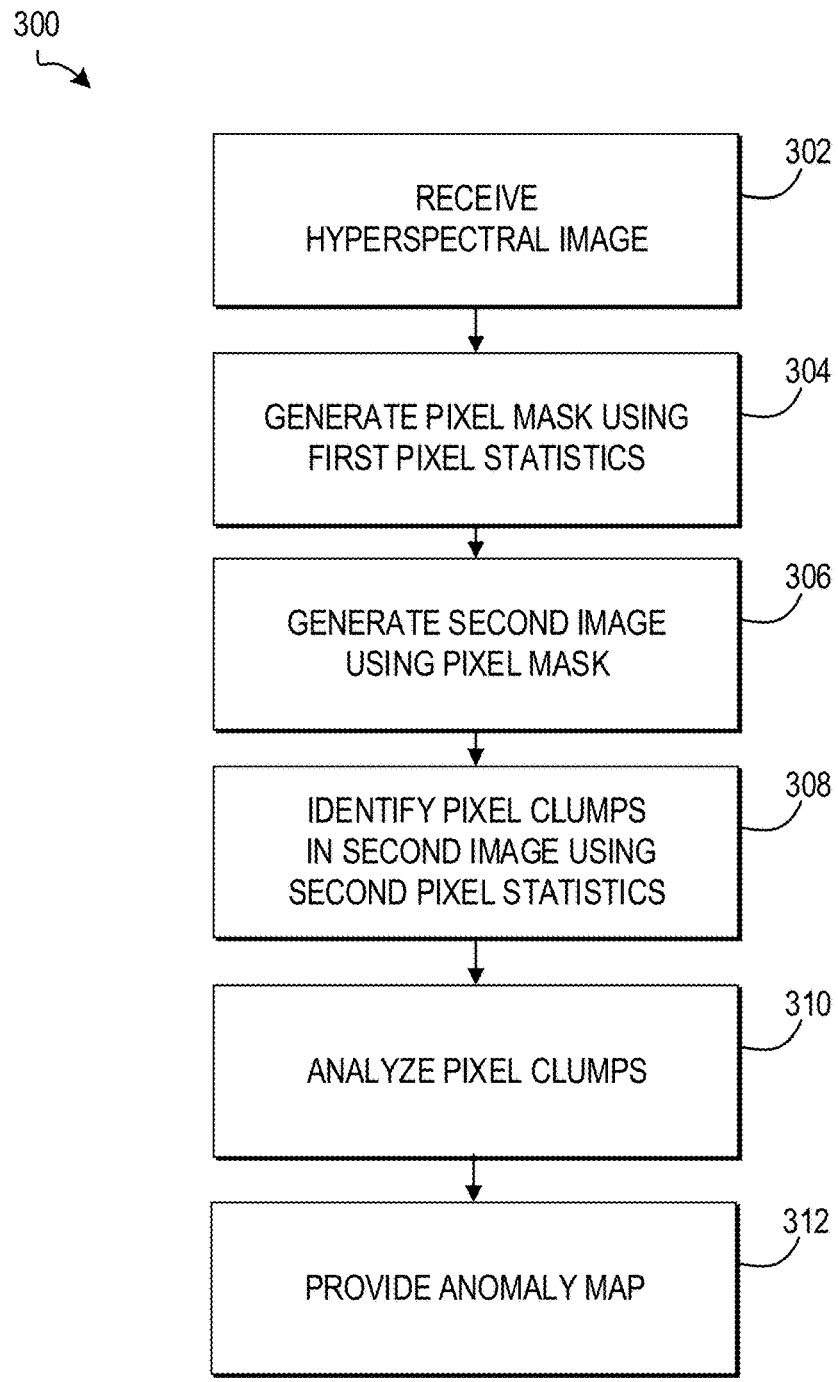
FIG. 3A illustrates a method of rapid anomaly detection.

FIG. 3A illustrates a method of rapid anomaly detection 300. An example process 300 may begin with block 302, which recites "receive hyperspectral image." Block 302 may be followed by block 304 which recites "generate pixel mask using first pixel statistics." Block 304 may be followed by block 306 which recites "generate second image using pixel mask." Block 306 may be followed by block 308 which recites "identify pixel clumps in second image using second pixel statistics." Block 308 may be followed by block 310 which recites "analyze pixel clumps." Block 310 may be followed by block 312, which recites "provide anomaly map."

Block 302 recites "receive hyperspectral image." Receiving a hyperspectral image may include receiving an image having a spectral dimension in addition to spatial dimensions. Other data and information can also be received, including a derived index (e.g., derived index 206), zone strata (e.g., zone strata 208), and field boundary data (e.g., field boundaries 210). Imagery data other than hyperspectral imagery data may be received in this step in addition to or instead of the hyperspectral image and used throughout the process. The other imagery data may include but need not be limited to multispectral imagery and visible-light-spectrum images.

After receiving the hyperspectral image and other data, the process may detect and remove areas of extreme anomalies to improve accuracy, such as by reducing false positive and false negative anomaly detections. Extreme anomalies may include irrigation infrastructure, roads, non-crop areas, and other elements. To remove these false positive detections an extreme value filter may be used to mask or otherwise identify pixels or regions past a threshold. These extreme anomalies can be removed or otherwise addressed. Once these extreme anomalies are addressed, the rapid anomaly detection algorithm recalculates pixel statistics based on the zone strata. These steps are described in block 304 and block 306.

Block 304 recites "generate pixel mask using first pixel statistics." The first pixel statistics describe statistical characteristics of pixels within the hyperspectral image or within a subset of the hyperspectral image (e.g., within the field boundaries of the hyperspectral image). The pixel statistics can include statistics, such as a mean pixel value, a median pixel value, and standard deviation statistics. A pixel value may include a reflectance value measured by the sensor or a derivative thereof (e.g., an index such as a derived index). Generating a pixel mask using the first pixel statistics can include iterating through pixels of the hyperspectral image and adding a pixel to the pixel mask if the value of the pixel passes a threshold. The threshold can be a specific number (e.g., a pixel's value passes the threshold if the pixel's value is greater than fifty units), can be determined statistically (e.g., a pixel's value passes the threshold if the pixel's value is more than a certain standard deviation away from a mean pixel's value), can be determined based on historical results or statistics (e.g., persistent anomalies), or a combination thereof (e.g., the pixel value passes the threshold if the value is more than fifty units greater than the median pixel value). In an example, the threshold may be the pixel having a value more than one, more than two, more than three, more than four, more than five, or more than six standard deviations from a mean pixel value. The threshold may be selected to mask extremely anomalous pixels that likely do not provide useful information (e.g. infrastructure or non-seeded areas). The mean pixel value may be an average pixel value of the entire image or a subset of the image, such as within a field boundary or within a zone stratum to which the pixel belongs. In some examples, the pixel mask may be a previously-generated pixel mask or may be generated based on a previously-generated (e.g., historical) pixel mask.

Figure 3B:
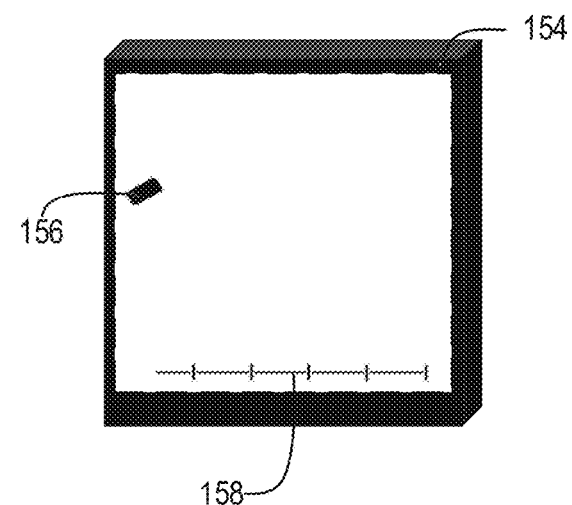
FIG. 3B illustrates an example image mask based on the hyperspectral image of FIG. 1B.

FIG. 3B illustrates an example pixel mask generated based on the hyperspectral image of FIG. 1B, showing the tractor 156, the irrigation equipment 158 and the area outside of the field boundary 154 masked-off.

Returning to FIG. 3A, block 306 recites "generate second image using pixel mask." In an example, the second image is a new image created using a combination of the original image and the pixel mask. In another example, the second image is a modified version of the first image using the pixel mask. The masked pixels (e.g., the pixels identified as being extreme anomalies in block 304), can be marked in a manner that removes them from consideration by later algorithms (e.g., by making the pixel transparent, by making a pixel a specific value that indicates that it is removed from consideration). In an example, the pixel is returned to a mean by making the pixel value the same as the mean value of the image or a subset of the image.

After generating the second image, the second image can be stratified or re-stratified into zone strata representing zones of crop variation due to intra-field inhomogeneity. This may be done by performing a stratification on the second image. This may be done by combining the second image with a stratification map received as input to the rapid anomaly detection process (e.g., zone strata data 208).

Figure 3C:
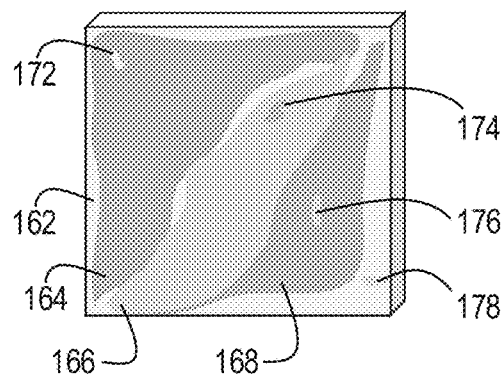
FIG. 3C illustrates an example image produced by applying the mask of FIG. 3B to the image of FIG. 1B.
Figure 3D:
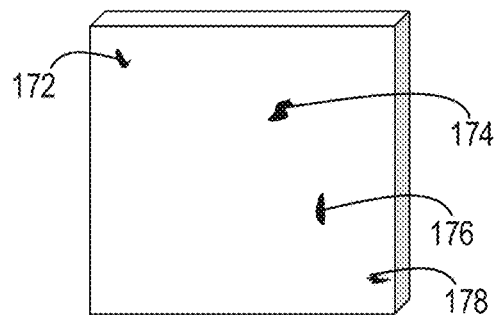
FIG. 3D illustrates an example anomaly map produced based on FIG. 3C.

FIG. 3C illustrates an example second image produced after applying the mask of FIG. 3B.

Returning to FIG. 3A, block 308 recites "identify pixel clumps in second image using second pixel statistics."

The second pixel statistics describe statistical characteristics of pixels within the second image. The pixel statistics may include statistics involving a mean pixel value and may involve standard deviation statistics or percentile rank within a stratum. A pixel clump is a grouping of pixels. Identifying a pixel clump may involve iterating through pixels of the second image, and comparing a respective pixel's value to a threshold. If the pixel's value is beyond a threshold, then the pixel is added to an existing pixel clump or a new clump is created for a pixel. In an example, the threshold may be the pixel having a value (e.g., at a spectral index) more than a particular standard deviation from a mean pixel value (e.g., more than two standard deviations away from the mean pixel value). In another example, percentile rank may be used as a threshold (e.g., rank less than 5th percentile or rank greater than 95th percentile). The mean pixel value may be an average pixel value of the zone strata to which the pixel belongs. This may increase the sensitivity of detection. In some examples, the mean pixel value may be an average pixel value of the entire image or a subset of the image, such as within a field boundary. In an example, a hyperspectral index that is sensitive to a specific vegetation feature or phenomenon may be used as input to improve detection of the specific vegetation feature or phenomenon. The highest and lowest index values per stratum can be isolated as anomalies that represent said vegetation feature or phenomena.

In an example, a pixel clump is a center pixel and immediately adjacent pixels, such as four pixels that share a boundary and/or corners with the center pixel. In an example, one or more of the immediately adjacent pixels are added to the clump because the center pixel passes a threshold without respect to the characteristics of the immediately adjacent pixels. In another example, the immediately adjacent pixels are candidates for being added to the center pixel clump and are only actually added to the clump if the respective immediately adjacent pixel also passes the threshold.

In another example, a pixel clump is a grouping of two or more sufficiently similar pixels. Identifying a pixel clump may involve iterating through pixels of the second image, and if a respective pixel's value is beyond a threshold, then the pixel is added to an existing pixel clump if there is an existing pixel clump that is sufficiently similar or to may be used to generate a new pixel clump if there is not a sufficiently similar existing pixel clump. An existing pixel clump may be sufficiently similar if the pixel is within a particular distance of the existing pixel clump, if the pixel has similar characteristics to pixels within an existing pixel clump, and/or the pixel is otherwise similar. A pixel can be within the particular distance if the pixel is less than a particular virtual distance away (e.g., less than approximately ten pixels away, five pixels away, one pixel away or another distance) or if the pixel is less than a physical distance away (e.g., the pixel represents an area of the field less than approximately ten meters, five meters, three meters, one meter or another distance away from an area of the field represented by an existing clump). In another example, a pixel is added to a clump if the pixel is separated from the clump only by a masked-off area (e.g., masked-off irrigation equipment can obscure a contiguous clump area).

The process of identifying a pixel clump can include or be a part of cleanup operations, such as filtering and smoothing. Cleanup operations may remove noise from the image and decrease false positive rates. Cleanup operations can also include applying a majority filter to the second hyperspectral image. The majority filter can include analyzing surrounding pixel values and assigning a majority value to all surrounding pixels.

Block 310 recites "analyze pixel clumps." The pixel clumps can be analyzed to predict a likely cause or source of the anomaly. The digital elevation model can provide absolute topographic values not available from a hyperspectral image. Mean topographical position can include characteristics of the land, such as if the particular pixel clump is on a relative incline. A factor in determining the likely cause of the anomaly can include a mean topographical position of the pixel clump based on a digital elevation model of the agricultural land. Another factor can include a calculation of a mean spectral signature for the pixel clump. Calculating the mean spectral signature for the pixel clump can involve summing the spectral signatures for each pixel in the clump and then dividing the resulting value by the total number of pixels within the clump. Another factor can include the topographical wetness index of a pixel or clump. In an example, the topographical wetness index can be calculated by: ln $$\left(\frac{a}{\tan b}\right),$$

where a is the upstream contributing area in square meters, and where b is slope in radians.

In an example, the process can determine that the likely source of anomaly of the pixel clump is excessive moisture based on factors. One factor can include determining that the mean spectral signature of the pixel clump has a decreased reflectance at about 960 nanometers or 1450 nanometers, such that the spectral signature is beyond a threshold. Excessive moisture can also be indicated by the mean spectral signature of the pixel clump having increased reflectance at about 550 nanometers, such that the spectral signature is beyond a threshold. Another factor can include determining that the pixel clump has a high topographical wetness index, such that the spectral signature is beyond a threshold. The threshold can be based on other pixels within the clump's zone stratum, other pixels within the field, historical measurements for the clump, a healthy or unhealthy model, or based on other factors. The threshold can be based on or vary according to a signature goal or objective.

In another example, the process can determine that the likely source of anomaly of the pixel clump is insufficient moisture based on factors. One factor can include determining that the mean spectral signature of the pixel clump has an increased reflectance at about 960 nanometers or at about 1450 nanometers, such that the reflectance is beyond a threshold. Another factor can include determining that the pixel clump's mean spectral signature has an increased reflectance at about 550 nanometers, such that the reflectance is beyond a threshold. Another factor can include determining that the pixel clump has a low topographical wetness index, such that that the topographical wetness index is beyond a threshold. The thresholds can be based on other pixels within the clump's zone stratum, other pixels within the field, historical measurements for the clump, a healthy or unhealthy model, or based on other factors.

In another example, the process can determine that the likely source of anomaly of the pixel clump is a weed infestation responsive to determining the pixel clump has a greenness value that exceeds a particular threshold. The thresholds can be based on other pixels within the clump's zone stratum, other pixels within the field, historical measurements for the clump, a healthy or unhealthy model, or based on other factors In another example, the process can determine that the likely source of anomaly of the pixel clump is insect damage responsive to determining that the mean spectral signature of the pixel clump has a reduced ratio of red to near-infrared on the spectral index such that the reduced ratio is beyond a threshold. The thresholds can be based on other pixels within the clump's zone stratum, other pixels within the field, historical measurements for the clump, a healthy or unhealthy model, or based on other factors. Insect damage may be more common along edges of a field that may correspond to field boundary data. In some implementations, pixel clumps proximate to an edge of a field or proximate field boundary data may be analyzed for insect damage.

In another example, the process can determine that the likely source of anomaly of the pixel clump is a disease based on various factors. One factor can include determining that the mean spectral signature of the pixel clump has a reduced ratio of red to near-infrared, such that the ratio is beyond a threshold. The thresholds can be based on other pixels within the clump's zone stratum, other pixels within the field, historical measurements for the clump, a healthy or unhealthy model, or based on other factors. Another factor can include that the mean spectral signature of the pixel clump has ratio associated with the disease. Another factor can be that the mean topographical position of the pixel clump is within preferences associated with the disease.

In some examples, the pixel clumps can be analyzed as modified to determine the source of the anomaly. In another example, the pixel clumps can be analyzed as against an unmodified pixel value. For example, prior to arriving at block 310, the process may have caused various operations to be performed on the pixels, such as smoothing, noise reduction, majority filtering, correction based on zone strata, or other operations. In some examples, these operations are used to create the clumps and then one or more of these operations can be rolled back and the analysis of the clump can be performed without one or more of the operations.

The analysis need not be a binary analysis in which an anomaly has been or has not been identified. Instead, the analysis may express a result in the form of a confidence level in the detection of an anomaly. For example, the likelihood can be based on how many different factors are met, how many thresholds are passed, and other factors.

In an example, the analysis may be conducted using an artificial intelligence, such as a neural network, or a machine learning system. For instance, a neural network may be trained against already-classified pixel clumps and then run against unclassified clumps to determine one or more potential anomalies.

Figure 4:
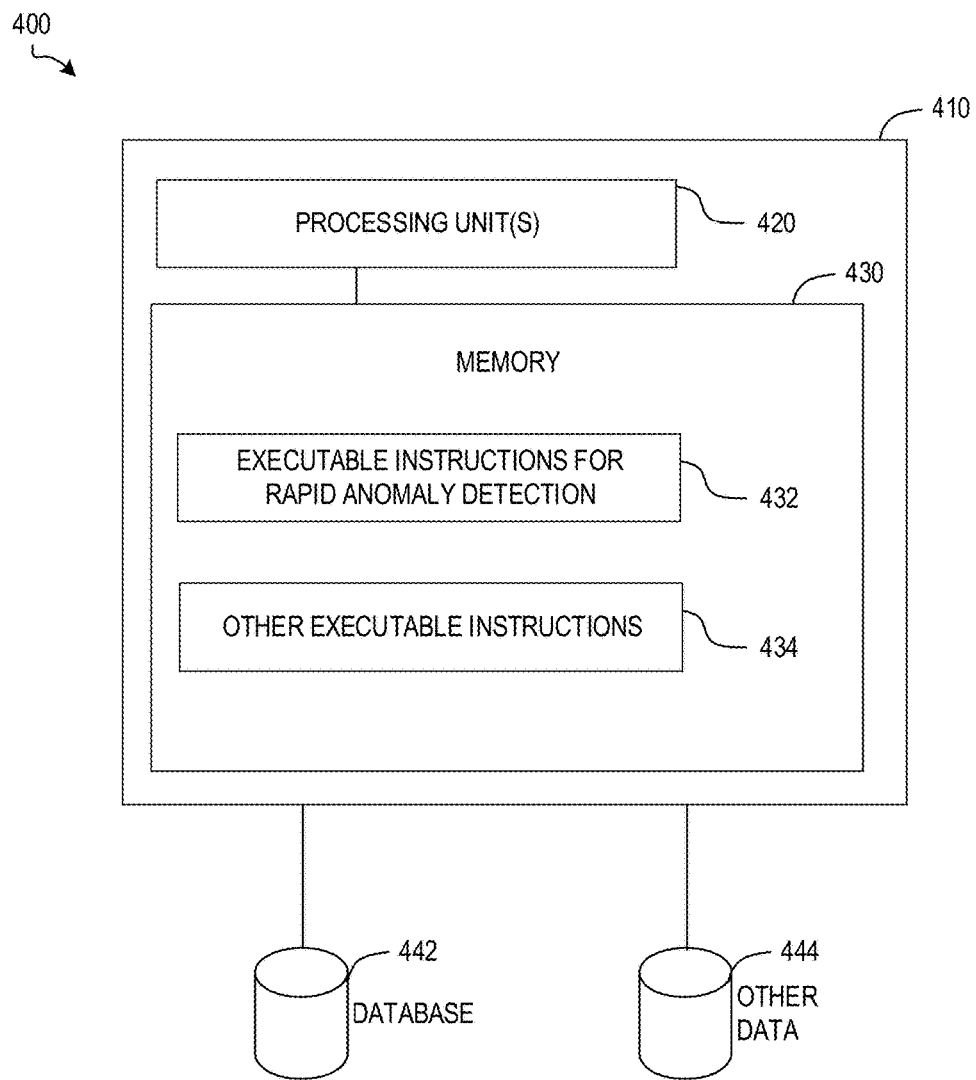
FIG. 4 illustrates an example computing system.

Block 312 recites "provide anomaly map." The anomaly map is a map or other description of anomalies in a field identified using the rapid anomaly detection model (e.g., anomaly map 214). The anomaly map can be incorporated into or used to produce a field report describing conditions of a field or to provide an alert to a potential crop issue FIG. 4 is a schematic illustration of a computing system 400 in accordance with examples described herein. The system 400 includes a computing device 410 that includes one or more processing units 420 and memory 430. The processing units 420 may include central processing units (CPUs) as well as specialized processing units, such as graphics processing units (GPU). The memory 430 is encoded with executable instructions for rapid anomaly detection 432 and/or other executable instructions 436. The computing device 410 is in communication with electronic storage for a database 442, electronic storage and/or electronic storage for other data 446. In this manner, the computing device 410 may be programmed to provide some or all of the processes described herein.

The arrangement of computing components is flexible. Although shown as contained in a single computing device 410, in some examples, the processing units 420 and the memory 430 may be provided on different devices in communication with one another. Although the executable instructions are shown encoded on a same memory 430, in other examples a different computer readable media may be used and/or the executable instructions may be provided on multiple computer readable media and/or any of the executable instructions may be distributed across multiple physical media devices. The electronic storage for a database 442 and electronic storage for other data 446 are shown in separate electronic storage units also separated from the computing device 410, but they need not be. In other examples, one or more of the storage 442, 444 may be stored in the computing device 410, such as in memory 430 or elsewhere, such as in a device separate from the computing device 410.

Computing device 410 may be implemented using generally any device sufficient to implement and/or execute the systems and methods described herein. The computing device 410 may, for example, be implemented using a computer such as a server, desktop, laptop, tablet, or mobile phone. In some examples, computing device 410 may additionally or instead be implemented using one or more virtual machines. The processing unit(s) 420 may be implemented using one or more processors or other circuitry for performing processing tasks described herein. The memory 430 and storage 442, 444 may be implemented using any suitable electronically accessible memory, such as a non-transitory computer-readable medium.

The executable instructions for rapid anomaly detection 432 are executed to provide or implement the systems and methods described herein, such as those described in relation to FIGS. 1-3D. The database 442 may be a database configured to store information regarding the systems and methods described herein.

CONCLUSION

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting anomalies in agricultural land, the method comprising:
   computing first pixel statistics of pixels of a first hyperspectral image of agricultural land, the pixels within boundaries specified by field boundary data;
   generating a pixel mask using the first pixel statistics or historic anomalies;
   applying the pixel mask to the first hyperspectral image to generate a second hyperspectral image;
   forming groups of pixels of the second hyperspectral image using zone strata of the agricultural land;
   computing second pixel statistics using the groups of pixels of the second hyperspectral image;
   identifying a pixel clump within the second hyperspectral image using the second pixel statistics, the pixel clump representing an anomalous area within the agricultural land;
   predicting a source of anomaly of the pixel clump; and
   generating an anomaly map using the pixel clump and the predicted source of anomaly of the pixel clump.

2. The method of claim 1, further comprising:
   determining a mean topographical position of the pixel clump using a digital elevation model of the agricultural land,
   wherein predicting a source of anomaly of the pixel clump comprises determining a likely source of anomaly of the pixel clump using the mean topographical position of the pixel clump.

3. The method of claim 1 further comprising:
   calculating a mean spectral signature for the pixel clump,
   wherein predicting a source of anomaly of the pixel clump comprises determining a likely source of anomaly of the pixel clump using the mean spectral signature of the pixel clump.

4. The method of claim 1, further comprising:
   determining a mean topographical position of the pixel clump using a digital elevation model of the agricultural land; and
   calculating a mean spectral signature of the pixel clump,
   wherein predicting a source of anomaly of the pixel clump comprises determining a likely source of anomaly of the pixel clump using the mean topographical position of the pixel clump and the mean spectral signature of the pixel clump.

5. The method of claim 4, wherein determining the likely source of anomaly of the pixel clump comprises:
   determining that the likely source of anomaly of the pixel clump is excessive moisture responsive to determining that the mean spectral signature of the pixel clump has reflectance below a first threshold at about 960 nanometers, or at about 1450 nanometers, or has reflectance above a second threshold at about 550 nanometers, and the pixel clump has a topographical wetness index that exceeds a third threshold.

6. The method of claim 4, wherein determining the likely source of anomaly of the pixel clump comprises:
   determining that the likely source of anomaly of the pixel clump is insufficient moisture responsive to determining that the mean spectral signature of the pixel clump has a reflectance above a first threshold at about 960 nanometers, or above a second threshold at about 1450 nanometers, or has reflectance above a third threshold at about 550 nanometers, and the pixel clump has a topographical wetness index below a fourth threshold.

7. The method of claim 4, wherein determining the likely source of anomaly of the pixel clump comprises determining that the likely source of anomaly is weed infestation responsive to determining the pixel clump has a greenness value that exceeds a threshold.

8. The method of claim 4, wherein determining the likely source of anomaly of the pixel clump comprises:
   determining that the likely source of anomaly of the pixel clump is insect damage responsive to determining that the mean spectral signature of the pixel clump has a ratio of red to near-infrared on the spectral index below a threshold.

9. The method of claim 4, wherein determining the likely source of anomaly of the pixel clump comprises:
   determining that the likely source of anomaly of the pixel clump is a disease responsive to determining that the mean spectral signature of the pixel clump has a ratio of red to near-infrared below a first threshold, the mean spectral signature of the pixel clump has ratio associated with the disease, and the mean topographical position of the pixel clump is within preferences associated with the disease.

10. The method of claim 1, wherein the pixel statistics comprise mean statistics and standard deviation statistics.

11. The method of claim 10, wherein generating a pixel mask using the first pixel statistics comprises adding a pixel of the first hyperspectral image to the pixel mask responsive to determining that the pixel is more than three standard deviations from a mean pixel value.

12. The method of claim 10, wherein identifying a pixel clump comprises adding a pixel of the second hyperspectral image to a clump responsive to determining that the pixel is more than one standard deviation from a mean pixel value.

13. The method of claim 10 comprising stratifying the second hyperspectral image into the zone strata using crop variation within the agricultural land due to intra-field inhomogeneity.

14. The method of claim 1, wherein identifying a pixel clump comprises applying cleanup operations.

15. The method of claim 14, wherein performing cleanup operations comprises applying a majority filter to the second hyperspectral image.

16. A method of detecting agricultural anomalies in an agricultural field, the method comprising:
   stratifying a hyperspectral image of an agricultural field into strata, the strata representing zones of crop variation due to non-anomalous intra-field inhomogeneity;
   applying an extreme value filter to the hyperspectral image that masks individual pixels or clusters of pixels of the hyperspectral image that are more than three standard deviations from a mean pixel value;
   calculating pixel statistics of the filtered hyperspectral image according to the strata;
   using the pixel statistics to isolate one or more clumps of pixels of the filtered hyperspectral image, each clump representing an anomaly within the agricultural field; and
   providing a location of at least one of the one or more anomalies.

17. The method of claim 16, further comprising:
   determining a mean topographical position of each pixel clump using a digital elevation model of the agricultural land; and
   classifying the anomaly of each pixel clump using the mean topographical position and mean spectral signature of a respective clump.

18. The method of claim 16, further comprising:
   calculating a mean spectral signature for each pixel clump; and
   classifying the anomaly of each pixel clump using a mean topographical position and mean spectral signature of a respective clump.

19. The method of claim 16, further comprising classifying the anomaly of each pixel clump using the mean topographical position and mean spectral signature of the respective pixel clump.

20. The method of claim 16, wherein using the statistics to isolate one or more clumps of pixels of the filtered hyperspectral image comprises:
   identifying clumps of pixels that are more than one standard deviation from a mean pixel value of a respective strata.

* * * * *